B. J. HASKINS.
HOLDING AND DRIVING DEVICE FOR TESTING PURPOSES.
APPLICATION FILED APR. 17, 1919.

1,310,396.

Patented July 15, 1919.
2 SHEETS—SHEET 1.

INVENTOR.
B. J. Haskins.
BY
*George H. Hooper*
ATTORNEY.

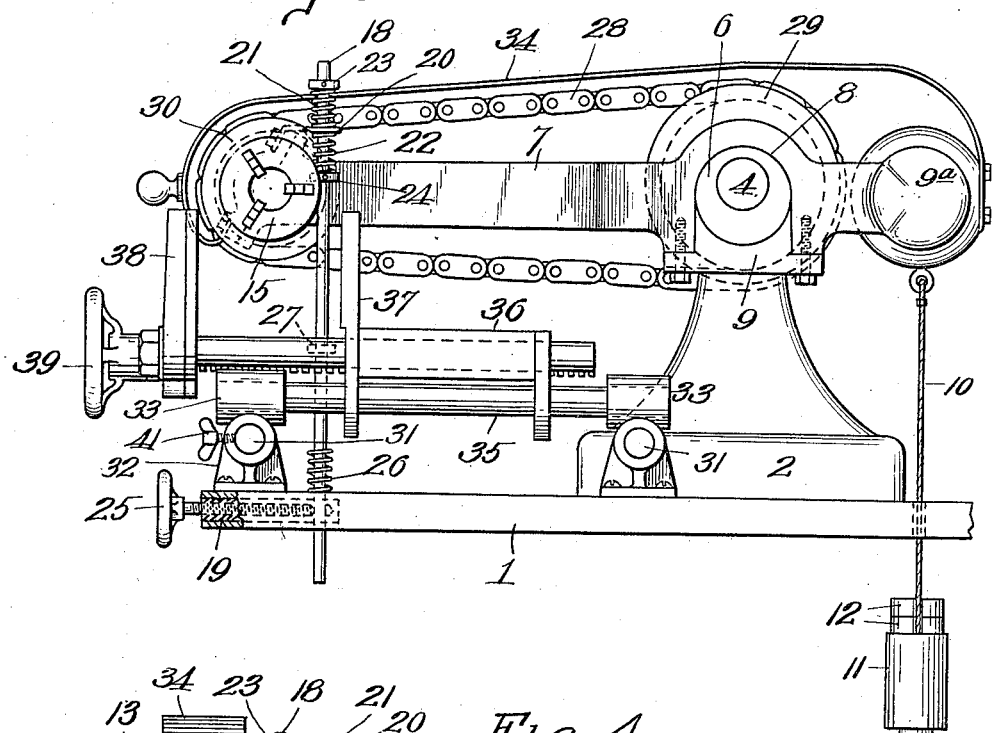
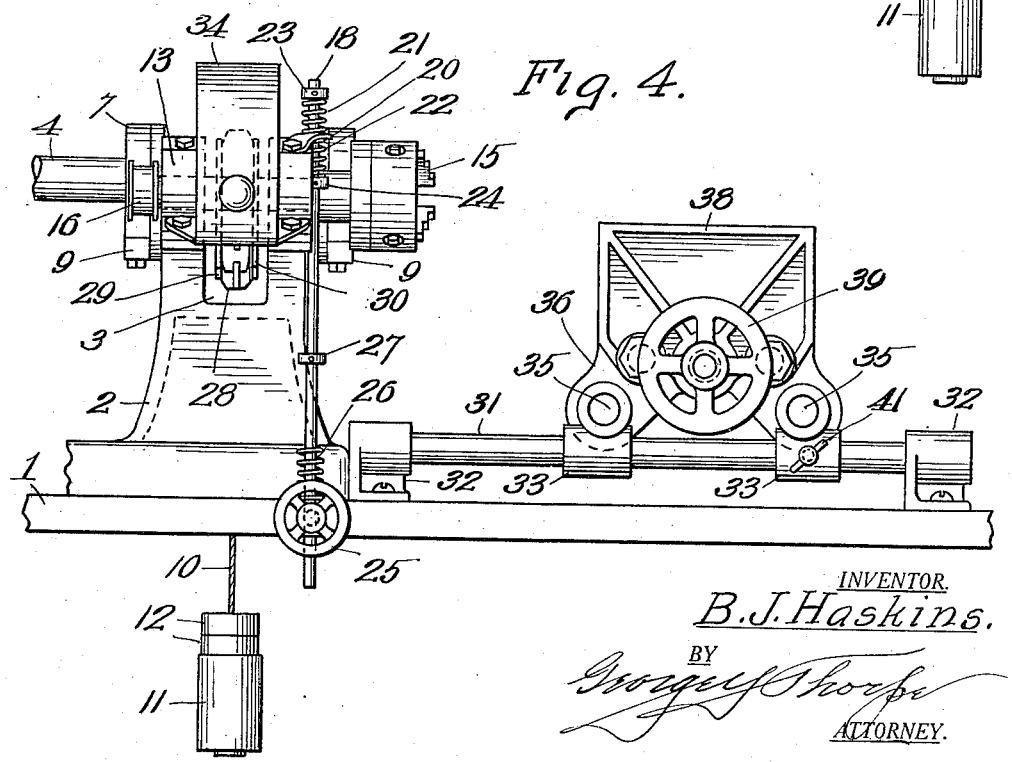

UNITED STATES PATENT OFFICE.

BUTLER J. HASKINS, OF KANSAS CITY, MISSOURI, ASSIGNOR TO E. S. COWIE ELECTRIC CO., OF KANSAS CITY, MISSOURI, A CORPORATION OF MISSOURI.

HOLDING AND DRIVING DEVICE FOR TESTING PURPOSES.

1,310,396.          Specification of Letters Patent.          Patented July 15, 1919.

Application filed April 17, 1919. Serial No. 290,750.

*To all whom it may concern:*

Be it known that I, BUTLER J. HASKINS, a citizen of the United States, residing at Kansas City, in the county of Jackson and State of Missouri, have invented certain new and useful Improvements in Holding and Driving Devices for Testing Purposes, of which the following is a specification.

This invention relates to holding and driving devices for testing purposes and more especially to a universal holding and driving device for testing automotive vehicle electric equipment, and has for its object to produce a device of the character named by which electric motors, magnetos and the like can be efficiently and intelligently tested regardless of the length thereof within reasonable limits, and regardless of the height of the shaft and of the fact that such shaft may have play or eccentric movement due to wear or because it has been slightly bent. A further object is to produce a test device of simple, strong, durable and comparative inexpensive construction.

With these objects in view the invention consists in certain novel and useful features of construction and combinations of parts as hereinafter described and claimed; and in order that it may be fully understood, reference is to be had to the accompanying drawings, in which:

Fig. 3, is a side view of the testing device.

Fig. 4, is a front view of the same.

Figure 1:
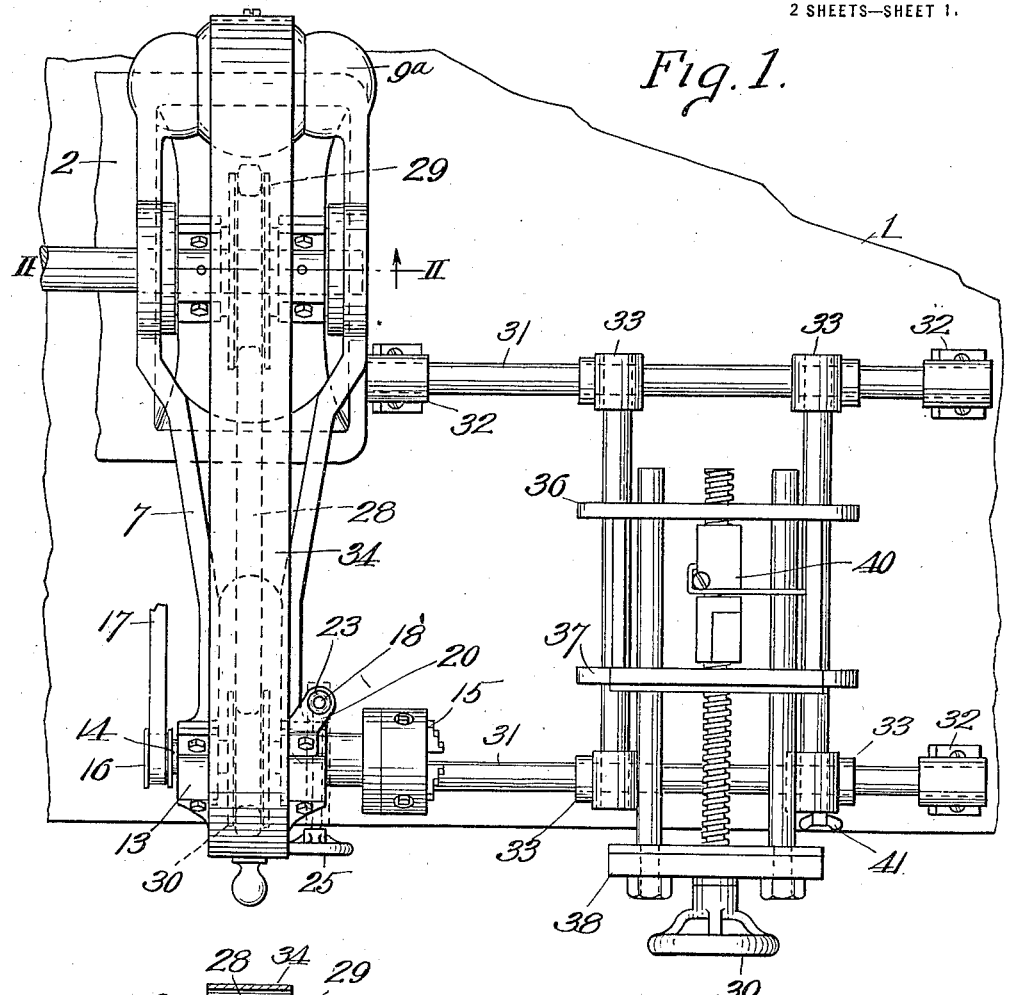
Figure 1, is a plan view of a testing device embodying the invention.
Figure 2:
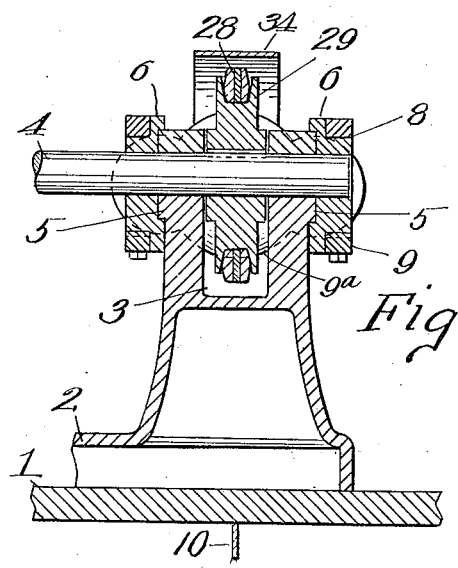
Fig. 2, is a section on the line II—II of Fig. 1.

Referring to the drawings in detail, 1 indicates a suitable bench or support, and mounted thereon is a pedestal or stand 2 bifurcated at its upper end as at 3 to produce a pair of spaced arms constituting journal bearings for a shaft 4 adapted to be driven by any suitable means at any desired or predetermined speed, and said arms are provided at their outer sides with outwardly projecting hubs 5 disposed concentrically of the shaft and forming journals for a pair of eccentrics 6 fitting loosely around the shaft.

An arm 7 is formed with an opening to produce a pair of parallel side portions bearing recesses 8 conforming to and snugly embracing the upper halves of the eccentrics 6, bearing caps 9 secured to the lower edges of said side portions being recessed in their upper edges to conform to and engage the lower halves of said eccentrics which thus constitute a pivotal point for said arm 7 and a means whereby said arm can be adjusted endwise transversely of the axis of said shaft.

The rear ends of the side portions of the arms are connected by a relatively heavy portion or weight $9^a$, and suspended therefrom by a cable 10 is a counterweight 11 upon which is superposed removable weights 12, so as to facilitate counterbalancing the arm to compensate for endwise adjustment thereof and for the weight of an electric tachometer mounted upon said arm 7, as is contemplated. As the use of the tachometer is not imperative however, it is not illustrated.

The front end of the arm 7 is bifurcated and forms in conjunction with caps 13 bearings for a short shaft 14 arranged parallel with shaft 4, and equipped at one end with a chuck 15 and at its opposite end with a belt pulley 16 engaged by a belt 17, for transmitting power to the tachometer or equivalent device.

The swinging arm 7 is provided with locking means whereby the elevation of the front end of said arm may be fixed with due allowance for sufficient vertical movement to compensate for eccentric movement of the shaft of the device to be tested, as hereinafter referred to. This locking device comprises a vertical rod 18 extending through the table or support 1 and a threaded sleeve 19 secured rigidly in the front edge of said table or support, the rod also extending through a bracket 20, secured to one of the caps 13 of the arm 7 so as to move with the latter, and fitted around said rod and bearing against opposite sides of said bracket are upper and lower springs 21 and 22, respectively engaging collars 23 and 24 secured upon said rod and tending to hold the arm 7 yieldingly at a fixed height when the rod itself is located against endwise or vertical movement, and to accomplish locking of the rod against such movement a hand-operated screw 25 is mounted in the threaded sleeve 19 and impinges against the side of said rod.

A cushion spring 26 fits around rod 18 and rests upon the table or support, and the collar 27 mounted on the rod is adapted by engagement with said spring to cushion and limit downward movement of the front end of the arm and thereby guard against any chance of injury to the chuck or other parts carried by said arm, such other parts comprising a link belt 29 for transmitting power from a grooved drive wheel 28 secured on shaft 4, to a grooved wheel 30, secured on the chuck shaft 14.

Mounted upon the table at the chuck side of the swinging arm, is a vise for holding the motor or other device, not shown, to be tested. The vise comprises a pair of parallel rods 31 mounted in brackets 32 secured to the table, the rods extending parallel with shaft 4 and being equipped with slidable sleeves 33. It also comprises parallel rods 35 extending at right angles to the rods 31 and journaled in said sleeves, and with a frame 36 adjustable back and forth on rods 35 and comprising a stationary jaw 37 and a movable jaw 38, one of which should be nonmagnetic, together with a jaw-adjusting screw 39 and a mechanism 40 for locking the jaws on the device being tested, and leaving the frame 36 and the device being tested, free for back and forth movement upon rods 35, this locking mechanism not being detailed as it forms a part of standard vise equipment and forms no indispensable part of this invention. The motor or the like to be tested, is clamped between the jaws 37 and 38 by the adjustment of the screw 39 so as to dispose the shaft of the motor in the vertical plane of the chuck shaft as nearly as practicable, and then the rods 35 together with said jaw and the motor or the like to be tested, are slid laterally on the rods 31 to dispose the end of the shaft of the motor in proper relation to the chuck, the arm 7 being adjusted vertically to dispose the axis of the chuck shaft in the same horizontal plane as the axis of the motor shaft, after which the arm is secured against movement except that permitted by the springs 21 and 22, by the proper adjustment of the hand screw 25, and to guard against any chance of the motor backing away from the chuck, a set screw 41 is mounted in one of the sleeves 33 for impingement on the corresponding rod 31.

From the foregoing it will be apparent that the motor, magneto or other device to be tested can be easily and quickly secured in the vise and lined up and engaged with the chuck and that when so positioned, it can be driven at a predetermined speed from shaft 4, which speed through an electric tachometer or the like and suitable electric indicating apparatus of well-known character, will show at all times the R. P. M. of the apparatus being tested. The apparatus being tested is also electrically connected with suitable apparatus which will indicate the E. M. F., amperage, voltage, resistance and the like of such tested apparatus. It will thus be understood, of course, that the person in charge of the test, knowing the rating of the apparatus being tested, can quickly determine the condition of the apparatus of any make of automotive electric equipment.

To take up slack in the drive belt, due to stretching thereof, the eccentrics will be turned to effect endwise adjustment of arm 7, and increase the distance between drive shaft 4 and the driven or chuck shaft 14, and the counter-balancing of the said arm can be maintained by adding one or more weights 12. To protect the operator from injury through entanglement with the power transmitting belt, a guard 34, is secured to arm 7, over said belt.

From the above description it will be apparent that I have produced a device of the character described, which makes provision for limited universal movement of the shaft of the generator or other device being tested, and while I have shown and described, the preferred embodiment of the same, it will be obvious that it is susceptible of modification in various particulars within the principle of construction involved.

I claim:

1. In holding and driving devices for testing automotive equipment, the combination of a swinging arm, a shaft journaled therein and provided at one end with a chuck, and yielding means for holding said arm against unlimited swinging movement, with a device embodying means for holding equipment to be tested, adapted for adjustment toward the said chuck and free to vibrate radially of the axis of said chuck.

2. In holding and driving devices for testing automotive equipment, the combination of a swinging arm, a shaft journaled therein and provided at one end with a chuck, yielding means for holding said arm against unlimited swinging movement, with a device embodying means for holding equipment to be tested, adapted for adjustment toward the said chuck and free to vibrate radially of the axis of said chuck, and means to lock said device against movement toward or from said chuck.

3. In holding and driving devices for testing automotive equipment, the combination of a swinging arm, a shaft journaled therein and provided at one end with a chuck, yielding means for holding said arm against unlimited swinging movement, with a vise having a part adjustable toward and from the chuck end of said shaft, and a part carried by the said adjustable part, and free to vibrate radially of the axis of said chuck shaft.

4. In apparatus of the character described, an arm for swinging movement, having a fixed fulcrum, means for adjusting the arm endwise relative to its fulcrum, means for counter-balancing the arm, a drive shaft having its axis coincidental with the said fulcrum, a shaft journaled in said arm and disposed parallel with the said drive shaft and geared thereto, and yielding means for limiting swinging movement of the said arm.

5. In apparatus of the character described, an arm for swinging movement, having a fixed fulcrum, means for adjusting the arm endwise relative to its fulcrum, means for counter-balancing the arm, a drive shaft having its axis coincidental with the said fulcrum, a shaft journaled in said arm and disposed parallel with the said drive shaft and geared thereto, an adjustable rod, a bracket movable with said swinging arm, and fitting slidingly on said rod, and a pair of counteracting springs bearing against opposite sides of said bracket and pressing in opposite directions against said rod.

In testimony whereof I affix my signature.

BUTLER J. HASKINS.

Copies of this patent may be obtained for five cents each, by addressing the "Commissioner of Patents, Washington, D. C."